T. C. DILL.
CHANGE SPEED DEVICE.
APPLICATION FILED JAN. 22, 1914.
1,185,486.
Patented May 30, 1916.
3 SHEETS—SHEET 1.
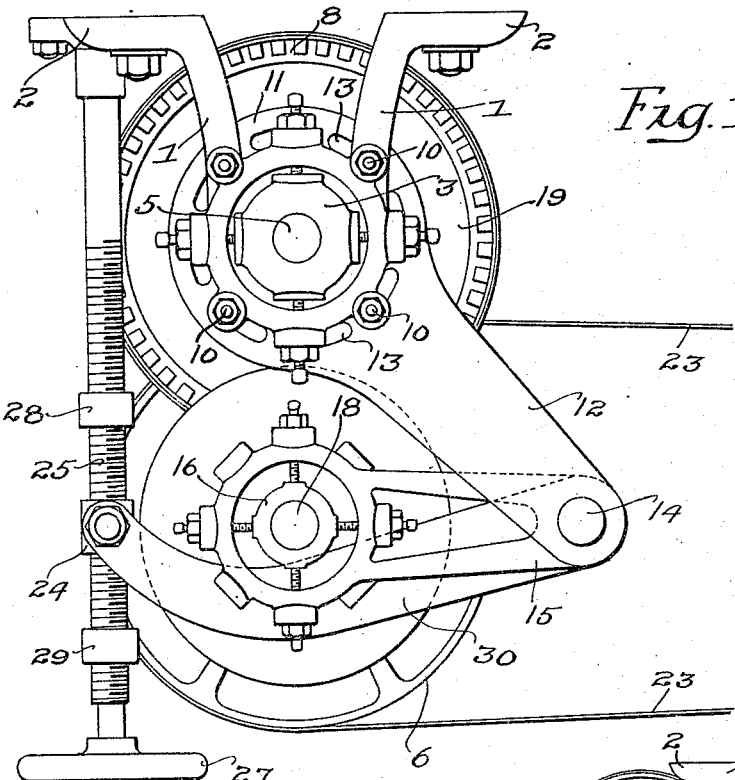
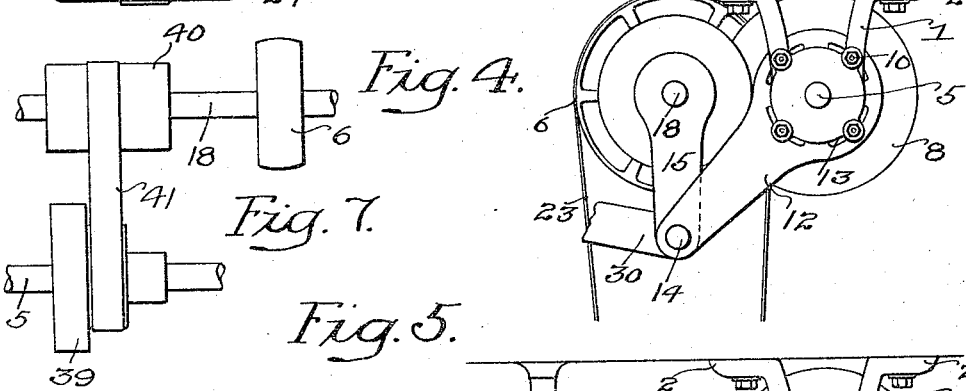
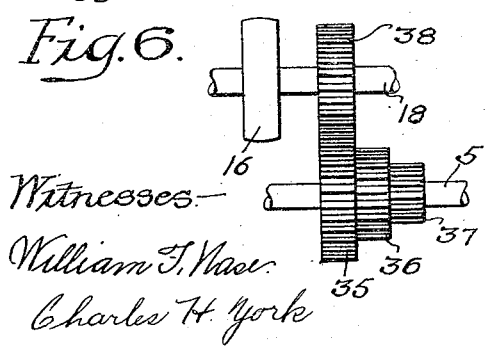
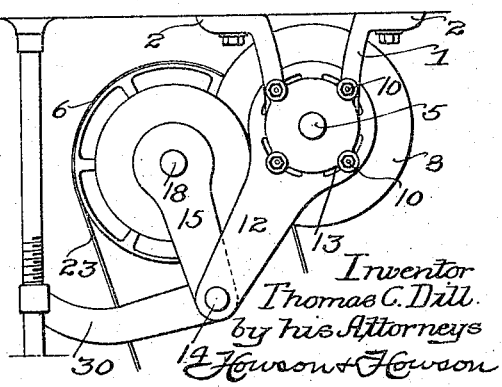

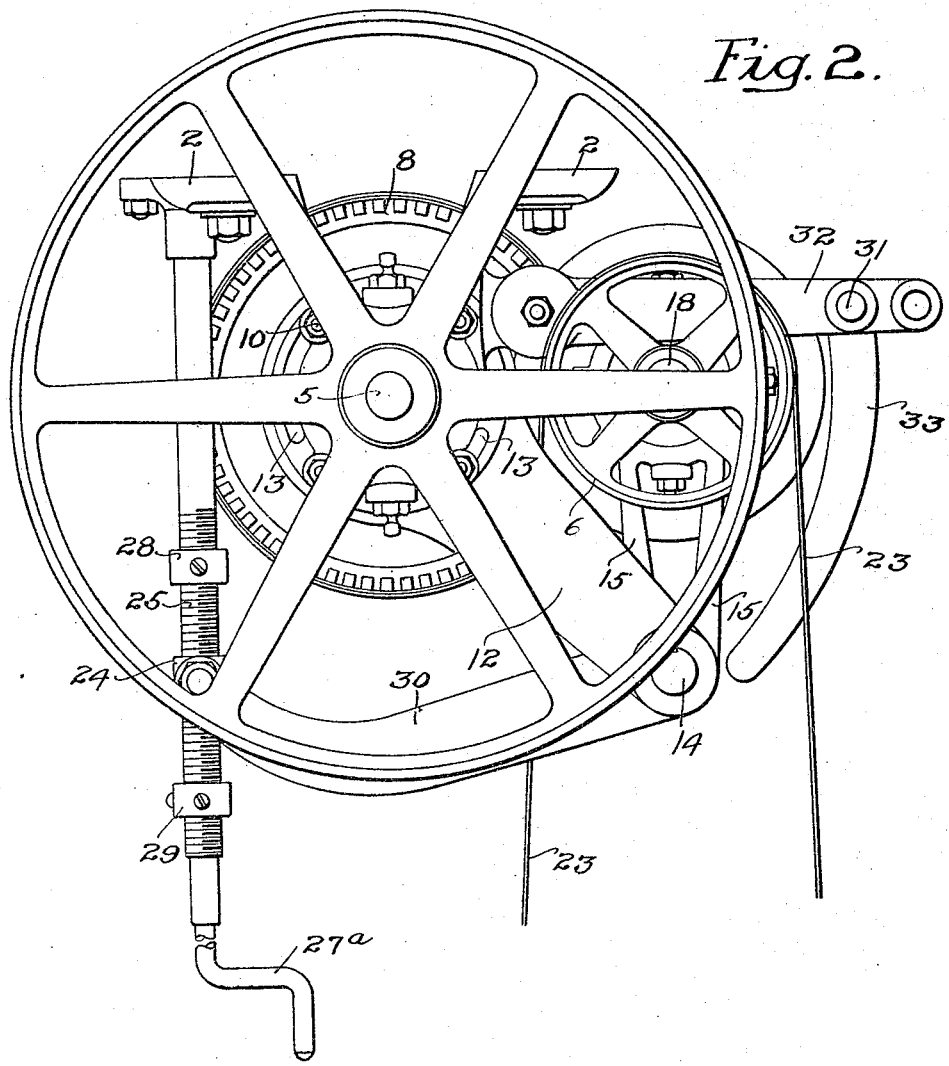

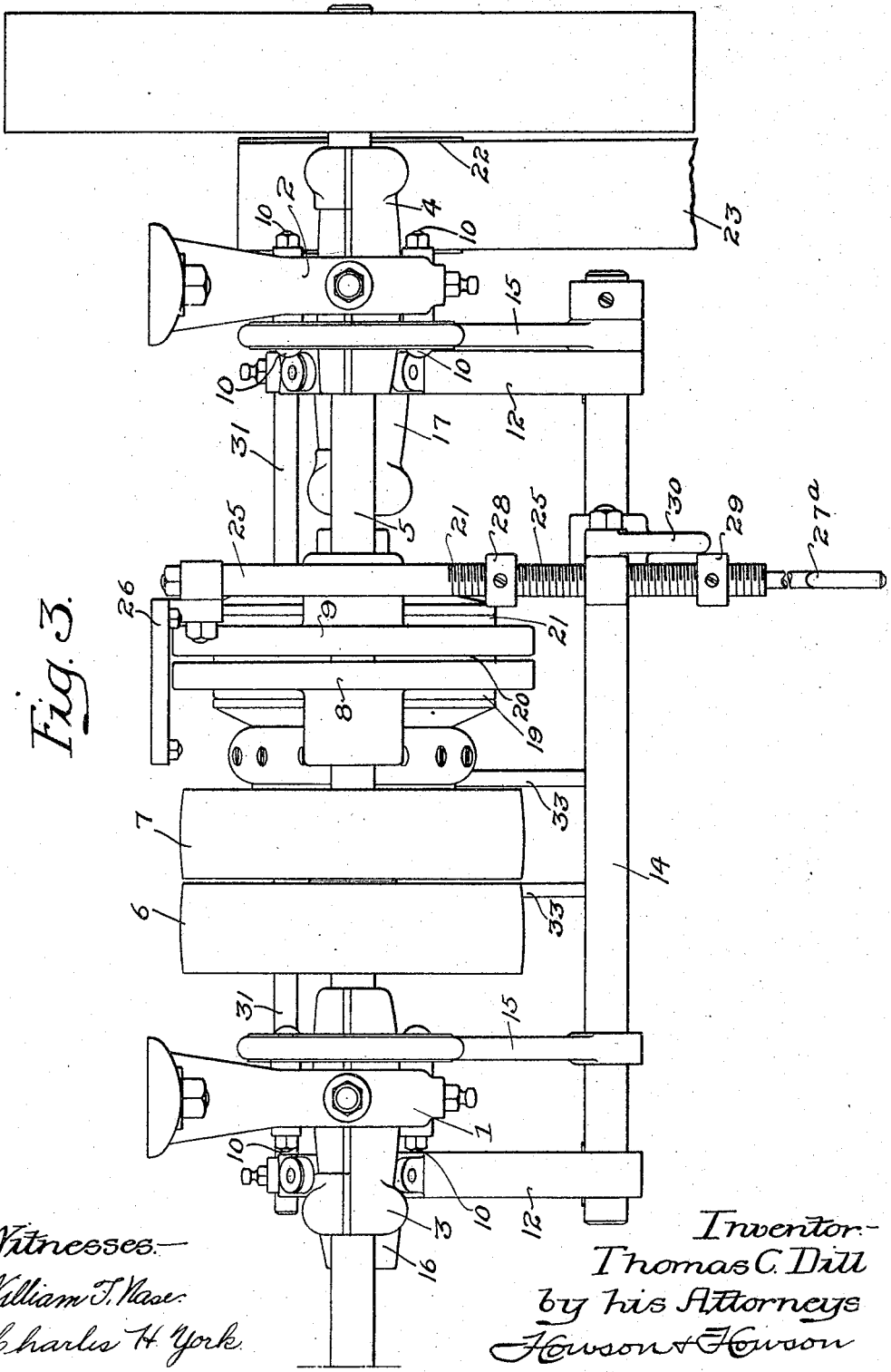

UNITED STATES PATENT OFFICE.

THOMAS C. DILL, OF PHILADELPHIA, PENNSYLVANIA.

CHANGE-SPEED DEVICE.

1,185,486.    Specification of Letters Patent.    Patented May 30, 1916.

Application filed January 22, 1914.  Serial No. 813,737.

*To all whom it may concern:*

Be it known that I, THOMAS C. DILL, a citizen of the United States, residing in Philadelphia, Pennsylvania, have invented certain Improvements in Change-Speed Devices, of which the following is a specification.

In that class of change speed devices characterized by the use of two sets of intermeshing friction disks, much inconvenience has frequently been experienced in installing the apparatus, owing to the necessity for so mounting the bodily movable shaft with its disks as to permit of its adjustment without material variation of its distance and hence that of the pulley carried by it, from the driving or driven shaft from which power was received or to which power was delivered. It has, therefore, usually been considered necessary for a manufacturer to keep in stock a large number of special castings or forgings, in order that such change speed mechanism might be properly installed according to any one of a number of requirements or to specially design the apparatus for any given installation, and even then trouble was frequently experienced and unsatisfactory results were obtained, owing to the great difficulty of adapting a certain mechanism to a given location of the driving and driven shafts with which it had to be used.

One object of my invention, therefore, is to provide a change speed mechanism of the friction disk type, with novel means for adjustably supporting the bodily movable shaft with its disks, so as to make it possible to conveniently adapt any particular installation to any given position of shaft to which power is to be transmitted or from which it is received, it being further desired that the device, whereby the above noted desirable result is obtained, shall be simple, substantial and easily adjusted, as well as relatively inexpensive to make and install.

Another object of the invention is to provide a change speed mechanism employing a cone pulley, cone gears or any form of coöperating friction disks, with means for adjustably supporting one of the power transmitting elements or sets of elements to permit of a variation of the speed of the driven element, together with means for so mounting this supporting means as to permit of its adjustment, in order to accommodate the apparatus to varying positions of the source of power or pulley actuated thereby.

These objects and other advantageous ends I secure as hereinafter set forth, reference being had to the accompanying drawings, in which:—

Figure 1 is an end elevation of a friction disk change speed device, showing my invention as applied thereto; Fig. 2 is an end elevation of an installation, similar to that of Fig. 1, illustrating certain of the parts in positions to suit them to a belt which extends substantially at right angles to that of the apparatus of Fig. 1; Fig. 3 is a side elevation of the mechanism shown in Fig. 2; Figs. 4 and 5 are elevations, to some extent diagrammatic, illustrating the parts constituting my invention as adjusted to suit the apparatus to two different positions of the belt, and Figs. 6 and 7 are diagrammatic views, illustrating forms of variable speed devices with which my invention may be employed.

In the above drawings, 1 and 2 represent hangers supported from any suitable structure and carrying bearings 3 and 4, in which is mounted a shaft 5. On this shaft are fast and loose pulleys 6 and 7 from which extends a belt (not shown) for driving any desired machine, and there are also fixed on this shaft a pair of friction disks 8 and 9, although it is obvious that one or more than two of such disks may be employed, depending upon the design of the apparatus and the amount of power to be transmitted.

Each of the hangers 1 and 2 has a series of bolts 10 extending in lines parallel to the shaft 5 and passing respectively through the slots of a substantially circular plate 11, having a projecting arm 12. These slots 13 are formed concentric with the center line of the shaft 5 and they are preferably of such length that by slacking off the bolts 10, the position of the arm 12 may be changed through an angle of about thirty degrees. If it be desired to adjust the arm through an angle greater than this, the bolts are removed and after the plate has been rotated to bring the arm 12 into the desired position, they are replaced and again tightened.

The two arms 12 carry a rotatable shaft 14 to which are keyed a pair of arms 15, in turn supporting bearings 16 and 17 carrying the bodily movable shaft 18 of the mechanism. On this latter shaft are keyed a set of friction disks 19, 20 and 21 intermeshing with the disks 8 and 9 of the shaft 5, and there is also keyed to said bodily movable shaft 18 a pulley 22, from which a belt 23 extends to a driven machine. On the shaft 14 is keyed or otherwise fixed an operating arm 30, whose outer end is pivoted to a nut 24, through which operates a screw 25 rotatably hung from a bracket 26 fastened to the ceiling or other suitable suspending structure. This screw has an operating handle or wheel 27, and is provided with a pair of stops 28 and 29 for limiting the travel of the nut 24. It is noted that the arms 15, the shaft 14 and operating arm 30 together constitute a lever which is pivoted or fulcrumed on the two adjustable arms 12, so that by adjusting said lever on these latter arms the points of engagement of the friction disks and hence the speed of the driven shaft, may be varied.

When the above described mechanism is erected, it is obvious that the arms 12 must be adjusted on the supporting hangers 1 and 2 to project in such a direction that the arm-carrying shaft 14 will extend in a line substantially midway between the two runs of the belt 23, so that when said shaft is turned to move the disks 19, 20 and 21 toward or from the disks 8 and 9, there will be a minimum of variation of the length of said belt. This adjustment of said disks is accomplished by rotating the wheel or handle 27, which thus moves the nut 24 up or down on the screw 25, and through the arm 30 causes such movement of the shaft 14 as will swing the arms 15, and with them the shaft 18 and disks 19, 20 and 21 as noted.

In that form of the invention shown in Fig. 1, I have illustrated merely the main features of the mechanism, though in Figs. 2 and 3 I have shown a shifter bar 31 carried by the hangers 1 and 2 through arms 32, and also carrying a pair of belt-engaging arms 33. While in Fig. 1 I have shown the apparatus adjusted to drive a belt whose runs extend in substantially horizontal lines, in Figs. 2 and 4 I have illustrated the parts as arranged for a vertically extending belt. In Fig. 5 the apparatus is shown as set for use with the belt extending at an angle to the vertical.

While in Figs. 1 to 5 I have illustrated my invention as applied to a change speed device employing one form of co-acting friction disks, it is obvious that without material change it may be applied to other forms of power transmission mechanism including intermeshing gears or belt transmission devices. As typical of these, I have in Fig. 6 shown the shaft 5 as provided with a cone of gears 35, 36 and 37 and the adjustable shaft 13 I provide with a single longitudinally slidable gear 38 splined to said shaft so as to drive or be driven thereby, as the case may be. The shaft 18 is supported by means identical with that shown in the preceding figures, being carried by one pair of arms pivoted to the arms of a second pair, so that the gear 38 may be caused to mesh with any one of the three gears 35, 36 and 37, in such a position that its adjustment will cause a minimum change in the length of the belt 23.

Again, in Fig. 7 I have illustrated a cone pulley 39 fixed to the shaft 5 and a single relatively long pulley 40 fixed to the shaft 18, with a belt 41 connecting it with said pulley 39. As before, the shaft 18 is so mounted as to permit of its being moved toward or from the shaft 5 in order to transmit power from different portions of the pulley 39 to the pulley 40 or vice versa, and the member supporting it is carried on a second adjustable structure, which permits of the shaft 18 with its pulley 6 being so mounted as to cause a minimum of variation in the distance between it and the pulley for its belt, when the sped changing adjustment for the belt 41 is made.

I claim:—

1. The combination of two shafts; two sets of intermeshing friction disks respectively carried by said shafts; a structure supporting one of said shafts; and means adjustable concentrically of the other shaft for supporting said structure.

2. The combination of two shafts; two sets of intermeshing friction disks respectively carried by said shafts; an arm supporting one of said shafts; a third shaft for supporting said arm; a second arm carrying said third shaft and adjustable concentrically of the first shaft; with means for adjusting the third shaft and with it the first arm, to vary the positions of the intermeshing disks relatively to each other.

3. The combination of a shaft; a structure mounted to be adjustable concentrically of said shaft; a lever fulcrumed on said structure; a second shaft carried by one arm of said lever; and two sets of intermeshing friction disks respectively mounted on said shafts.

4. The combination of a shaft; a structure adjustable concentrically of said shaft; a two-armed lever fulcrumed on said structure; a second shaft carried by one arm of said lever; two sets of intermeshing friction disks respectively mounted on said shafts; with means operative on the second arm of said lever for varying the points of engagement of said friction disks.

5. The combination of a supporting structure; a shaft carried thereby; an arm carried by said structure and adjustable thereon concentrically of said shaft; a second arm carried by said first arm; a shaft carried by said second arm; two sets of intermeshing friction disks respectively mounted on the two shafts; and means for adjusting the second arm with its disks, toward and from the disks of the first shaft.

6. The combination of two shafts; two sets of co-acting friction disks respectively carried by said shafts; a supporting structure for one of the shafts; a member mounted on said structure so as to be adjustable thereon concentrically of its shaft; an arm carried by said member for supporting the second shaft; and means for varying the position of one set of the disks relatively to the other.

7. The combination of hangers; bearings respectively carried thereby; a shaft mounted in said bearings; arms respectively carried by said hangers and adjustable thereon concentrically of the shaft; a second shaft rotatably carried by the arms; a second set of arms fixed to said second shaft; a third shaft carried by said latter set of arms; two sets of intermeshing friction disks respectively carried by the first and third shafts; and an operating arm fixed to the second shaft.

8. The combination of hangers; bearings respectively carried thereby; a shaft mounted in said bearings; arms respectively carried by said hangers and adjustable thereon concentrically of the shaft; a second shaft rotatably carried by the arms; a second set of arms fixed to said second shaft; a third shaft carried by said latter set of arms; two sets of intermeshing friction disks respectively carried by the first and third shafts; an operating arm fixed to the second shaft; with an actuating device for said last arm, consisting of a nut carried thereby and a rotatable screw operative on said nut.

9. The combination of a supporting structure; two shafts; two coöperating power transmission elements respectively carried by said shafts; a member adjustably carried by the supporting structure; with a second member adjustably carried by said first member and supporting one of the shafts.

10. The combination of a supporting structure; two shafts; two sets of coöperating power transmission elements respectively carried by said shafts; a member carried by the supporting structure so as to be adjustable concentrically of one of the shafts; and a second member adjustably carried by said first member and provided with bearings for the second shaft.

11. The combination of two shafts; two sets of coöperating power transmission elements respectively carried by said shafts; an arm supporting one of the shafts; a third shaft for supporting said arm; a second arm carrying said third shaft and adjustable concentrically of the first shaft; with means for adjusting the third shaft and with it the first arm to vary the positions of the co-acting power transmission elements.

12. The combination of a supporting structure; a shaft journaled therein; a plurality of friction disks carried by said shaft; an arm having an enlarged end provided with a series of slots; bolts carried by the supporting structure and passing through said slots so as to adjustably support the arm in a position substantially concentric with the shaft; a second arm pivoted to the first arm; a shaft journaled in the second arm; a second series of friction disks carried by the second shaft and meshing with the disks of the first shaft; and means for swinging the second arm on its pivot to vary the points of engagement of the disks of the two sets.

In testimony whereof, I have signed my name to this specification, in the presence of two subscribing witnesses.

THOMAS C. DILL.

Witnesses:
WILLIAM E. BRADLEY,
WM. A. BARR.

Copies of this patent may be obtained for five cents each, by addressing the "Commissioner of Patents, Washington, D. C."